Jan. 20, 1942.  W. C. GOSS  2,270,288
STRAW BRIQUETTE AND ITS METHOD OF MANUFACTURE
Filed March 11, 1939
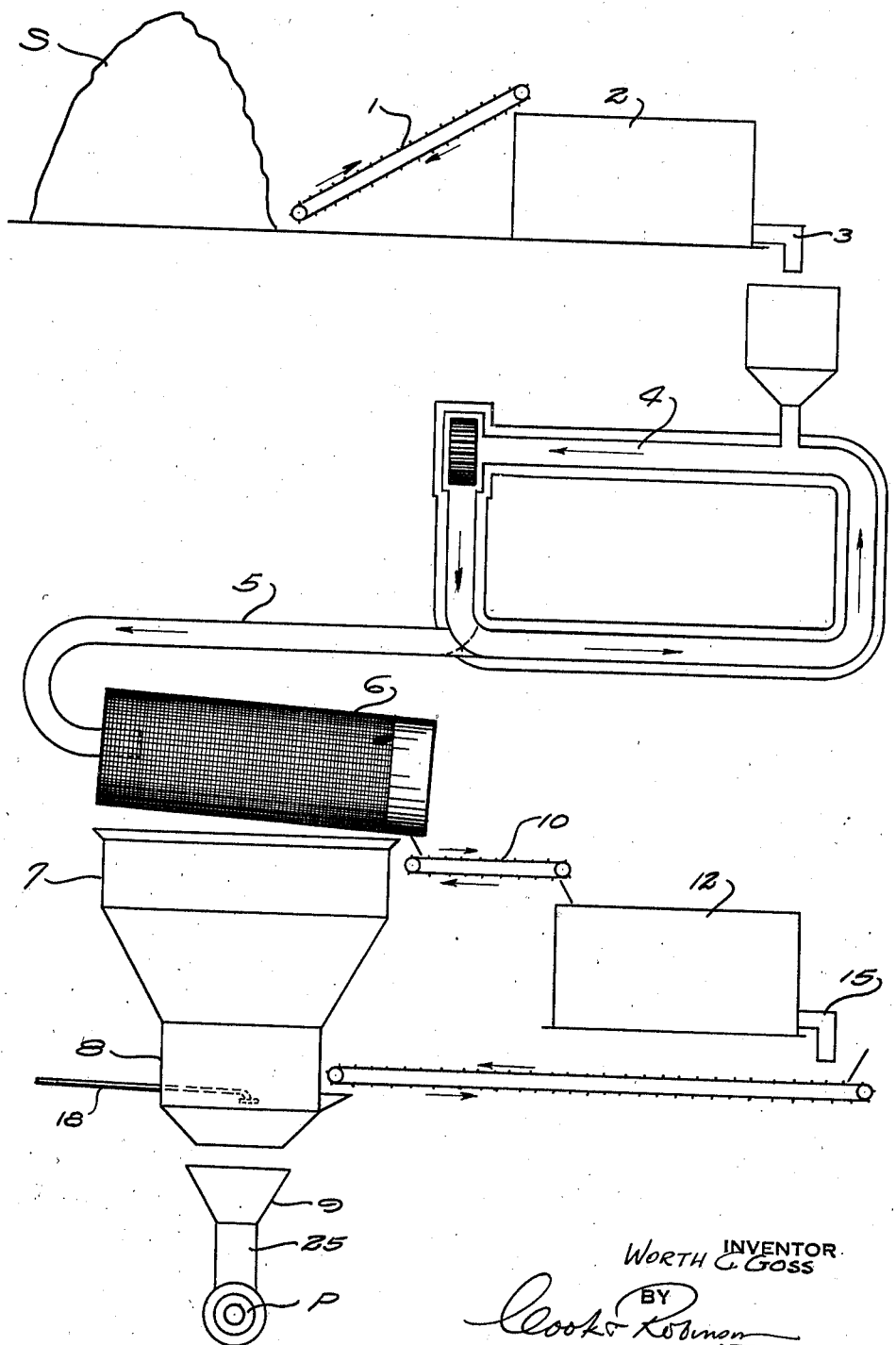
INVENTOR
WORTH C. GOSS
BY
Cook & Robinson
ATTORNEY Patented Jan. 20, 1942

2,270,288

UNITED STATES PATENT OFFICE 2,270,288

STRAW BRIQUETTE AND ITS METHOD OF MANUFACTURE

Worth C. Goss, Seattle, Wash.

Application March 11, 1939, Serial No. 261,282

4 Claims. (Cl. 44—10)

This invention relates to briquettes made from straw and the like, and to a method of treating and briquetting finely divided, powdered or comminuted cellulose material, such as straw.

Explanatory to the present invention, it will here be stated that straw as derived from wheat, rye, rice and other grains, has certain characteristics which are not to be found in many other plants, and which require that special consideration be given thereto when it is used in the making of briquettes.

Specifically, the stems, or stocks, of straw are hollow, without pith, and have slick, shiny inside and outside surfaces. By reason of these characteristics, the same treatment that is given ordinary sawdust, or other woody materials, and which renders them satisfactory for briquetting, cannot be followed in the making of briquettes from straw.

It has been effectively demonstrated by many experiments that it is practically impossible to compress straw permanently into bonding unity when the straw is comminuted by ordinary means and to the extent as employed in the comminuting of woody products for briquetting purposes. This lack of bonding action is experienced even when the comminuted straw is compressed under extremely high pressures, whether applied slowly or instantaneously, so long as the bulk of the material contains any appreciable portion of straw particles from which the glazed, shiny surfaces have not been removed. Experiment has shown, however, that if the straw to be briquetted is reduced to a comminuted state and then screened through a sieve of fine mesh, the dust that passes through the sieve may, with proper treatment, be very satisfactorily briquetted; this being due to the fact that this fine product which I refer to as "dust" does not contain any appreciable amount of pieces having slick, shiny surfaces.

The conclusions arrived at from the above mentioned experiments are that if the straw is reduced to pulverized or comminuted condition by any method that eliminates practically all of the shiny surfaces and leaves a preponderance of what might be called "dust particles," then satisfactory briquettes may be made therefrom and there will be no material waste of straw. It is to be understood that briquettes can be made even with quite a large percentage of large pieces of straw left in the comminuted material, but the nearer the approach to the elimination of all slick surfaced pieces, the better will be the bonding action of dust particles and the more substantial and solid the finished briquette will be.

The present invention therefore deals with the powdering and treatment of straw and the briquetting of this "dust" or powder in order that extremely hard, well bonded briquettes may be made therefrom and which briquettes will not deteriorate in storage, even if exposed to varying weather conditions, and in burning will last long and burn as solid lumps giving off an intense heat.

The principal objects of the present invention therefore may be stated as follows:

First, to provide a fuel briquette made from straw that will be satisfactory both from the standpoint of efficiency and economy in use and durability in storage.

Second, to provide a novel method of manufacturing straw briquettes whereby hard, well bonded articles may be made from comminuted straw, and which briquettes will not deteriorate when stored in places subject to damp weather, and will burn long, with great efficiency, and as a solid piece.

A feature of the present method lies in the moistening, or rehydrating of comminuted, or powdered straw after it has been dried out at high temperature for grinding; this being in order that the material may be more easily briquetted, and also in order to insure that the finished briquettes will contain a sufficient degree of moisture that they will not subsequently be disrupted by reason of absorption of additional moisture from the atmosphere.

Still another feature of the method resides in the application of water to the hot material to create steam for displacement of the air from the material, thus to insure a satisfactory bonding of the material when briquetted.

Briefly stated, the present method comprises passing the straw to be briquetted through a grinder, or mill, to reduce it to pieces of short length, then passing the reduced material through a drier, under high temperature for driving off all moisture therefrom, and for effecting a further reduction, then screening the dried material and delivering the "dust" thus derived to a point of use for briquetting. That material not passing through the screen may be directed to a second grinder for a further reduction and the pulverized material thus derived may also be delivered to the point of delivery to the briquetting press.

The material, while hot, may be immediately compressed into briquettes without the addition of moisture, and for some uses, briquettes thus made would be satisfactory. However, the present method contemplates the production of a superior briquette by the addition of a definite amount of moisture to the "dust" on its delivery to the press that makes the briquetting easier and also rehydrates the material so that the finished briquette will not be disrupted later by the absorption of atmospheric moisture.

The present method also contemplates the application of moisture to the dust to create air displacing steam, thus to make possible the satisfactory briquetting of this material by impact.

In the accompanying drawing there is illustrated diagrammatically the means for carrying out the drying and comminuting of the straw for delivery to a briquetting machine.

Referring now more in detail to the drawing and the steps of the method as practised in a preferred manner:

First, ordinary straw, as might be derived from the stack in the field, is delivered by a conveyor 1 into a suitable grinder, or hammer mill, as indicated at 2, for reduction to short pieces; for example, pieces not more than one and one-half inches long. From this mill the pieces are discharged through a connecting pipe 3 into a dryer 4, maintained at a temperature of from 400° F. to 450° F., in which the pieces are further reduced and also thoroughly dried. For this drying operation, I might employ apparatus of that kind shown in U. S. Patent No. 1,985,250 issued to O. P. M. Goss et al. on Dec. 25, 1934, or any other suitable type of machine; this being desirable because, as explained therein, the drier operates to reduce the material to dust-like condition.

It will be understood that the grinding and drying operation will not only reduce a large percentage of the material to powdery or dust-like form, but will also remove all moisture therefrom, and the more the drying, the easier is the reduction of material to "dust."

The material is discharged from the dryer through a tube 5 to a rotary screen 6 of fine mesh, for instance 14-mesh to the inch. The dust passing through the screen falls through an enclosure or housing 7 into a receiving hopper 8 from which it is discharged into the hopper 9 of the briquetting press.

Material that does not pass through the screen may be delivered therefrom onto a conveyor 10 which discharges it into a second hammer mill or grinder 12, which may be of any suitable kind, for further reduction. The powdered material discharged from this grinder 12 is discharged through a tube 15 to the hopper 8 and passes therefrom to the hopper 9 of the briquette press.

When the material is thus treated, it will be found that that entering the hopper 9 will have a preponderance of dust, containing no appreciable percentage of shiny surfaces that are so detrimental to briquetting. Furthermore, it is in proper condition for that further treatment necessary for briquetting whereby to obtain the superior type of briquette previously mentioned.

In this preferred treatment, the ground material which passes through the drier 4 will incidentally be heated to a high temperature, essentially a degree such that a large portion of the hygroscopicity of the material will be destroyed. While it might be possible then to produce briquettes of a certain degree of satisfaction from this hot material, provided that the air is removed therefrom, a more superior briquette will result, however, if a small amount of moisture be restored, or introduced, into the material after it has been heated to this high temperature for drying.

The desirability for heating the material to a high degree of temperature is, among other things, in order to bring it to a uniform and perfectly dry condition. This drying also makes the grinding operation easier and a more effective powdering action will result.

The desirability for adding a small amount of moisture or water to the material prior to its being briquetted is in order that the finished briquette will contain a certain definite moisture content that will insure it against absorbing moisture from the atmosphere while in storage; this being possible even though a large part of the moisture absorbing property of the material will be destroyed by the high heat treatment. It might be mentioned that the effect of adding moisture to the dry material and the extent to which it should be added is fully described and discussed in U. S. Patent No. 2,117,415 which was issued to O. P. M. Goss et al. on May 17, 1938.

It has been found most practical for the drying of the material prior to rehydrating it to cause it to move quickly through a heated tube by means of a fan as described in the above patent. The time element and the degree of heat applied should be such that the material will be thoroughly dried to a moisture free condition and raised to a temperature of approximately 430° F. At this degree of heat, which is desirable in order to bring the material to a moisture free condition and to destroy hygroscopicity, the material is too hot to absorb any moisture. Thus a finely divided water spray discharged into the hot straw will be generated into steam which displaces all air from the straw mass. In the present instance, however, the water is added just prior to the material being delivered to the press hopper. Then it can be compressed into briquettes of satisfactory character as the air has all been removed therefrom. It will be stated, however, that when water is to be added to the briquetting material for the purposes previously mentioned, the material should be cooled down to a lower temperature. This might be accomplished by directing a spray of water into the material as it is discharged from the hopper 8 into the hopper 9. A spray pipe 18 has been shown in the drawing for this purpose.

For example, if it is desired to provide briquettes having a 6% moisture content, water should be sprayed into the hot material to reduce its temperature to approximately 212° F., and at this temperature to have an 8% moisture content. In the event I desire to employ a briquetting press which utilizes a vacuum chamber for the extraction of air from the hydrated material, one such as is illustrated in my pending application Serial No. 180,376 filed on December 17, 1937, could be employed. In using that machine the hydrated material is forced by the feed ram through the feed tube into a closed hopper maintained under partial vacuum, where it is agitated or stirred. With the delivery of the material into the closed hopper, about 2% of the moisture contained will here be flashed into steam, incidentally cooling the material to a temperature of approximately 140° F.

At the temperature of 140° F., the material is then fed into the briquetting press and compressed in the complete absence of air. It has been found that in this press the rise of temperature of the material incident to compression by impact will not go above 212° and therefore there will be no danger of any disruptive action being caused by steam generation, but there will be a very desirable softening and bonding action resulting from the moisture and the compression which will insure a satisfactory briquette.

Thus, four objects are obtained by reason of the injection of water into the material; namely, first, the material will be reduced from the excessive high temperature to a degree satisfactory for briquetting; second, all air will be dispelled or displaced by the generated steam; third, the material will be softened to insure perfect and permanent bonding under briquetting pressure; fourth, possible disruption of the finished briquette by reason of moisture absorption from the atmosphere will be largely prevented.

Where vacuum is not effected in a closed hopper as in the machine of the above numbered application, satisfactory briquetting may be accomplished by use of steam to displace the air from the comminuted material.

It will be understood that since the material, as it falls from the hopper 8, will be extremely hot, the injection of moisture thereinto will cause steam to be generated which will flow upwardly and out of the top of the hopper 9 as the material flows down through the hopper to the feed tube 25 leading to the briquetting machine. This upward flow of steam will sweep all air from between the particles of the substance to be briquetted. Thus, when it is desired to use the present method of briquetting straw in a portable machine, as shown in my application filed February 24, 1939, under Serial No. 258,293, which may be moved from stack to stack on a field, all the equipment necessary to practise the present method is a combination of grinder, drier, water tank and a simple type of briquetting press.

Having thus described my invention, what I claim as new therein and desire to secure by Letters Patent is:

1. The method of making briquettes from straw characterized by its sleek, glazed surfaces, which comprises effecting a quick drying of the straw by subjecting it to heat, reducing it by pulverization while hot to a condition to include a preponderance of dust and eliminating the sleek, glazed surfaces, reducing the heat by an application of water to hydrate the material to substantially balance normal atmospheric conditions, then compressing the material into unity.

2. The method of making briquettes from straw, characterized by its sleek, glazed surfaces, comprising effecting a quick drying of the straw by subjecting it to an application of high heat, then reducing the dry straw to a finely divided state by pulverization whereby the sleek glazed surfaces are destroyed and leaving the material with a preponderance of straw dust, then reducing the temperature by an application of moisture to the hot material and whereby to rehydrate to a degree that will substantially balance normal atmospheric condition, then compressing the material in the absence of air into a unitary briquette.

3. The method of making a straw briquette comprising drying the straw at a high temperature and while hot and dry, reducing it to a finely divided condition by pulverization that destroys the smooth shiny surfaces and leaves a preponderance of dust, then partially cooling by the addition of water thereto and pressing into unity, all the air being excluded.

4. The method of making a briquette from straw characterized by its having sleek, glazed surfaces comprising drying the straw at a temperature such as to largely destroy its hygroscopicity, reducing it to a finely divided condition while still hot, pulverizing the straw in a manner whereby to destroy the sleek, glazed surfaces of the pieces, hydrating the material to a normal moisture content and forming it into a briquette, all the air being excluded.

WORTH C. GOSS.